(No Model.) 2 Sheets—Sheet 2.
J. SHUCK.
CULTIVATOR.
No. 377,174. Patented Jan. 31, 1888.
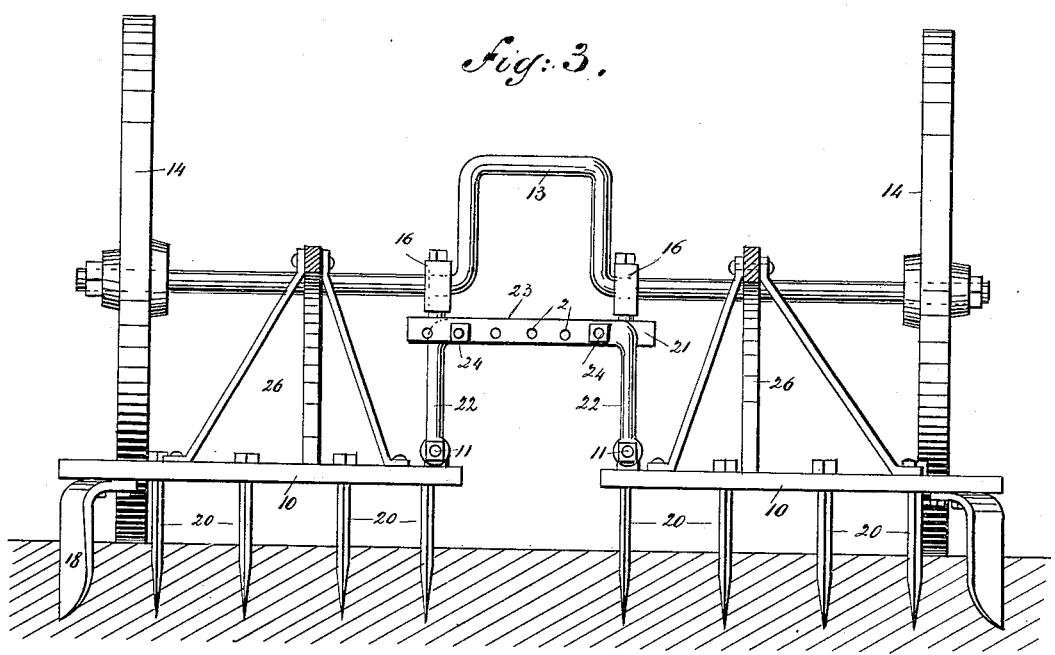
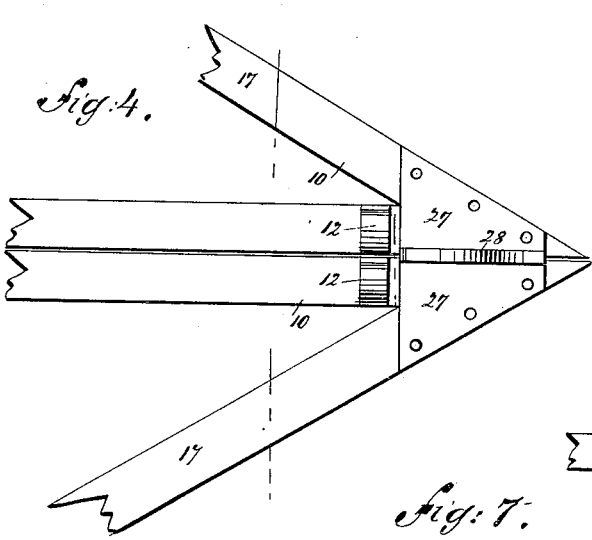
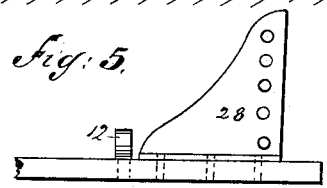
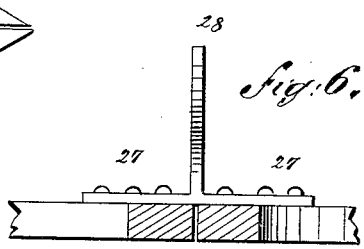
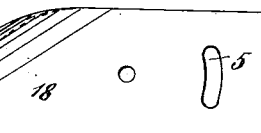
WITNESSES:
Chas. Nicla
C. Sedgwick
INVENTOR:
J. Shuck
BY Munn & Co.
ATTORNEYS.

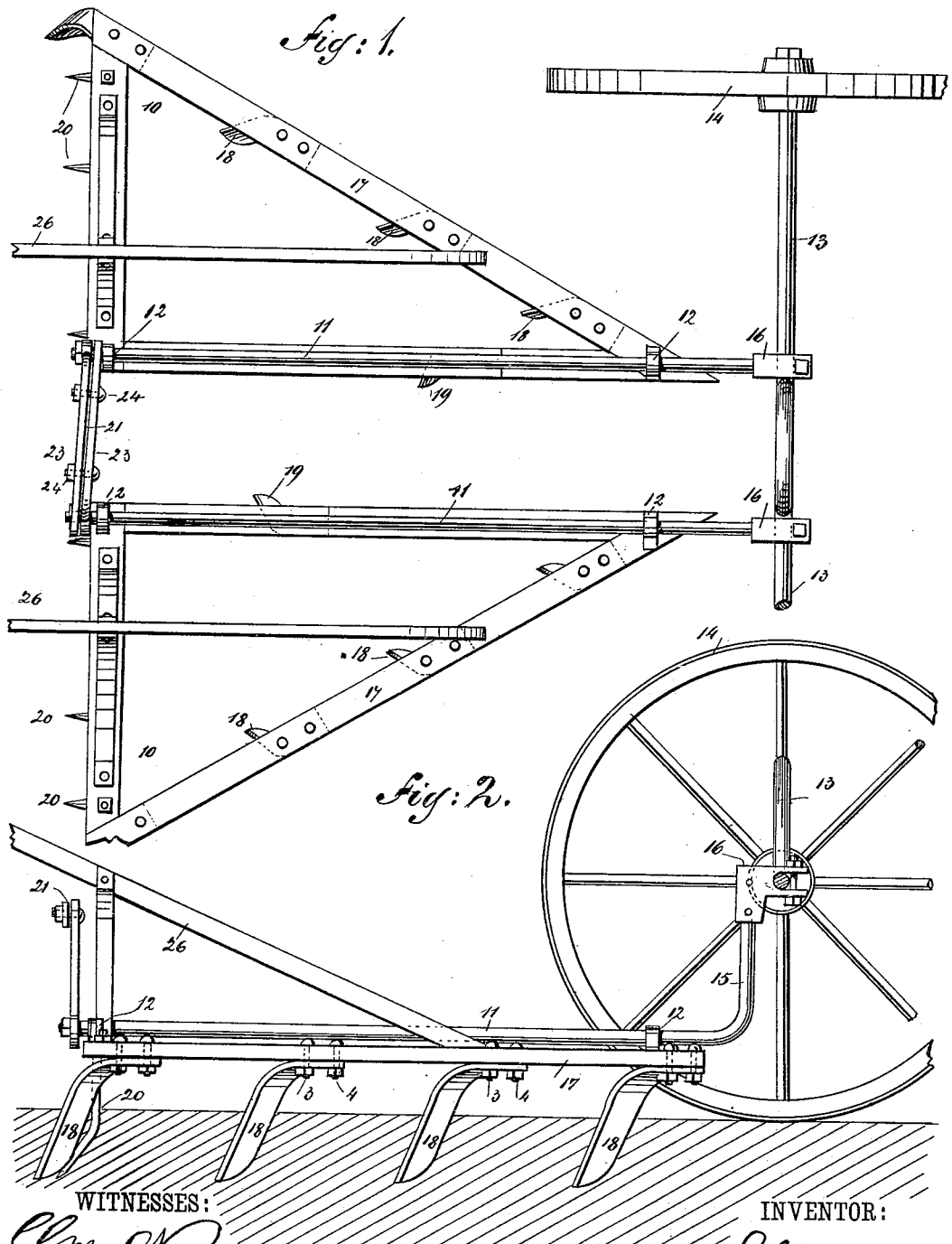

UNITED STATES PATENT OFFICE.

JACOB SHUCK, OF BLUE SPRINGS, NEBRASKA.

CULTIVATOR.

SPECIFICATION forming part of Letters Patent No. 377,174, dated January 31, 1888.

Application filed July 16, 1887. Serial No. 244,509. (No model.)

*To all whom it may concern:*

Be it known that I, JACOB SHUCK, of Blue Springs, in the county of Gage and State of Nebraska, have invented a new and Improved Cultivator, of which the following is a full, clear, and exact description.

This invention relates to a cultivator that is applicable for use either as a corn-cultivator or as a flat cultivator for wheat, the main object of the invention being to provide a cultivator which will not clog, and which will automatically adjust itself to the contour of the ground over which it is passing.

Reference is to be had to the accompanying drawings, forming a part of this specification, in which similar figures of reference indicate corresponding parts in all the views.

Figure 1 is a plan view of my improved form of cultivator. Fig. 2 is a side view of the same, the axle being shown in section. Fig. 3 is a rear view of the cultivator, the handles being shown in section. Fig. 4 is a plan view of the forward portion of the cultivator-frames, representing said frames as they appear when connected to the cultivator, in order that they may be used as an ordinary harrow. Fig. 5 is a side view of the construction illustrated in Fig. 4. Fig. 6 is a rear view of such construction, and Fig. 7 is a plan view of one of the shovels.

In constructing such a cultivator as the one illustrated in the drawings above referred to I provide two triangular frames, 10, which are connected to bars 11 by clips 12, the frames being free to turn upon their connection with the bars. These bars 11 I connect to an arched axle, 13, which carries wheels 14, the axle being of any of the well-known constructions, and in order that the frames 10 may normally rest in a plane lower than that occupied by the axle I bend the forward ends of the bars 11 upward, as shown at 15, these forward ends being rigidly connected to the clips 16, by means of which connection with the axle is established.

To the diagonal strips 17 of the frames 10 I secure rearwardly-extending shovels 18, other rearwardly-extending shovels, 19, being secured to the parallel lengths of the two frames, all the shovels being so mounted that they will throw the soil toward the space between the two frames.

To the rear cross-bars of each frame I connect teeth 20, which extend downward a short distance in a straight line, and are then bent so that they will extend to the rear at an obtuse angle. To the rear end of each of the bars 11 I connect one section of an expanding arch, 21, each of the arch-sections consisting of an upright, 22, and a horizontal length, 23, that is formed with a number of apertures, 2, the arrangement being such that the distance between the two frames 10 may be varied to suit the requirements of the case, for should it be desired to increase the space between the two frames they are simply drawn apart and the two horizontal lengths 23 are clamped together by their clamping-bolts 24, so as to hold the frames in the position to which they have been moved, a reverse movement being imparted to the frames when it is desired to decrease the space between them. The frames 10 are each provided with a handle, 26.

With such a cultivator as has been described, it will be seen that corn may be cultivated upon either side of the row, the loosened dirt being thrown toward the corn, while from the peculiar formation of the shovels and the teeth it will be impossible for the cultivator to clog, as all debris will slip from the said shovels or teeth, owing to their inclined position.

When it is desired to use the cultivator upon wheat or any other crop that is planted flat, the two frames 10 are disconnected from their bars 11, and are united by a coupling—such as that shown in Figs. 4, 5, and 6—said coupling being provided with two outwardly-extending wings, 27, that are bolted to the forward ends of the frames, a vertical flange, 28, extending upward from the wings, and being provided with a series of apertures, any one of which may be employed for the purpose of connecting the team to the cultivator.

In order that the throw of the shovels 18 may be varied as desired, I connect said shovels to their supporting-frames by bolts 3 and 4, the bolts 3 being pivot-bolts, while the bolts 4 are clamping-bolts, which pass through curved slots 5, that are formed in the shovel-standards, the arrangement being such that by swinging the shovels inward or outward upon their pivotal connection with the beam the angle of the shovels may be adjusted as desired.

Having thus fully described my invention, I claim as new and desire to secure by Letters Patent—

1. The combination, with a wheel-supported axle, of rearwardly-extending bars connected to said axle, and frames pivoted at their inner adjacent sides upon said bars, shovels and teeth being carried by said frames, substantially as described.

2. The combination, with frames carrying rearwardly-extending shovels and teeth, of bars to which the frames are connected by clips, an adjustable arch by which the bars are connected, and a means, substantially as described, for connecting the bars to a wheel-supported axle, substantially as described.

3. The combination, with triangular frames 10, carrying shovels 18, and teeth 20, which extend downward and to the rear from the under side of the frames, bars 11, to which the frames are connected by clips 12, the bars being arranged for connection with an axle, and an arch, 21, consisting of two sections, each of which sections is connected to one of the bars 11, said sections consisting of vertical portions 22 and horizontal portions 23, that are apertured, clamping-bolts being passed through the apertures of the two horizontal sections, substantially as described.

JACOB SHUCK.

Witnesses:
T. F. BURKE,
F. N. PROUT.